United States Patent [19]
Yehl

[11] 3,805,553
[45] Apr. 23, 1974

[54] MECHANICAL COUPLING HOUSING ASSEMBLY

[75] Inventor: Frank Albert Yehl, Allegany, N.Y.

[73] Assignee: Dresser Industries, Inc., Dallas, Tex.

[22] Filed: June 12, 1972

[21] Appl. No.: 261,840

[52] U.S. Cl. .................................. 64/32 R, 184/6 R
[51] Int. Cl. ............................................. F16d 3/84
[58] Field of Search ........... 64/32 R, 32 F; 184/6 R; 285/94, 302

[56] References Cited
UNITED STATES PATENTS

| | | | |
|---|---|---|---|
| 3,705,502 | 12/1972 | Padgett | 64/32 R |
| 3,123,990 | 3/1964 | Freeman | 64/32 F |
| 2,915,979 | 12/1959 | Bourke et al. | 64/32 R X |
| 2,271,060 | 1/1942 | Case | 64/32 R X |
| 1,862,099 | 6/1932 | Sheldrick | 64/32 X |

*Primary Examiner*—Manuel A. Antonakas

[57] ABSTRACT

The coupling guard or housing assembly described herein is primarily designed for use with high speed rotating machinery that requires continuous lubrication of the mechanical coupling joining driving and driven equipment. Due to thermal changes, expansion, contraction and misalignment occurs in the equipment necessitating a guard having the capability of compensating for such dimensional changes while maintaining its sealed condition. The housing assembly of this invention includes, in one aspect, upper and lower semicylindrical halves that are connected to form a cylindrical housing assembly. The cylindrical housing assembly is sealingly and telescopically arranged with respect to at least one adapter connecting the assembly to either the driving or driven apparatus. If considerable dimension changes are anticipated in the equipment, both ends of the housing assembly can be provided with sliding seals which permit greater movement.

9 Claims, 3 Drawing Figures

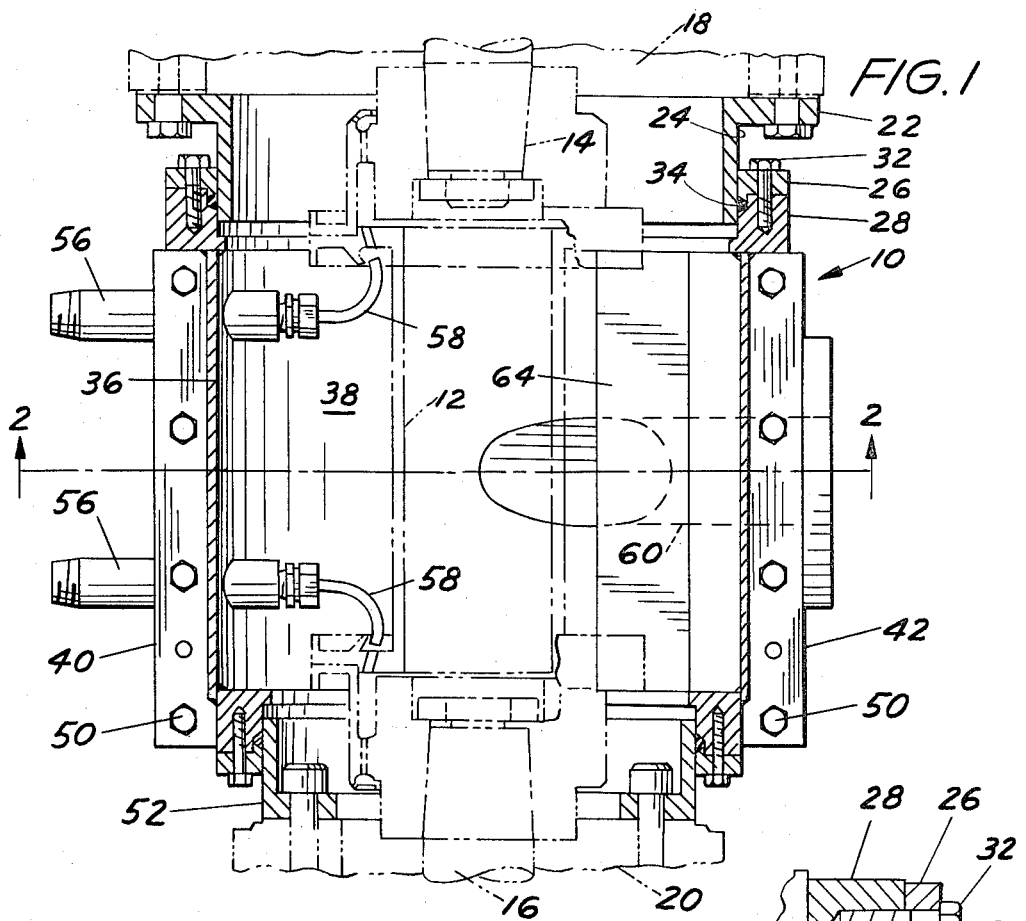
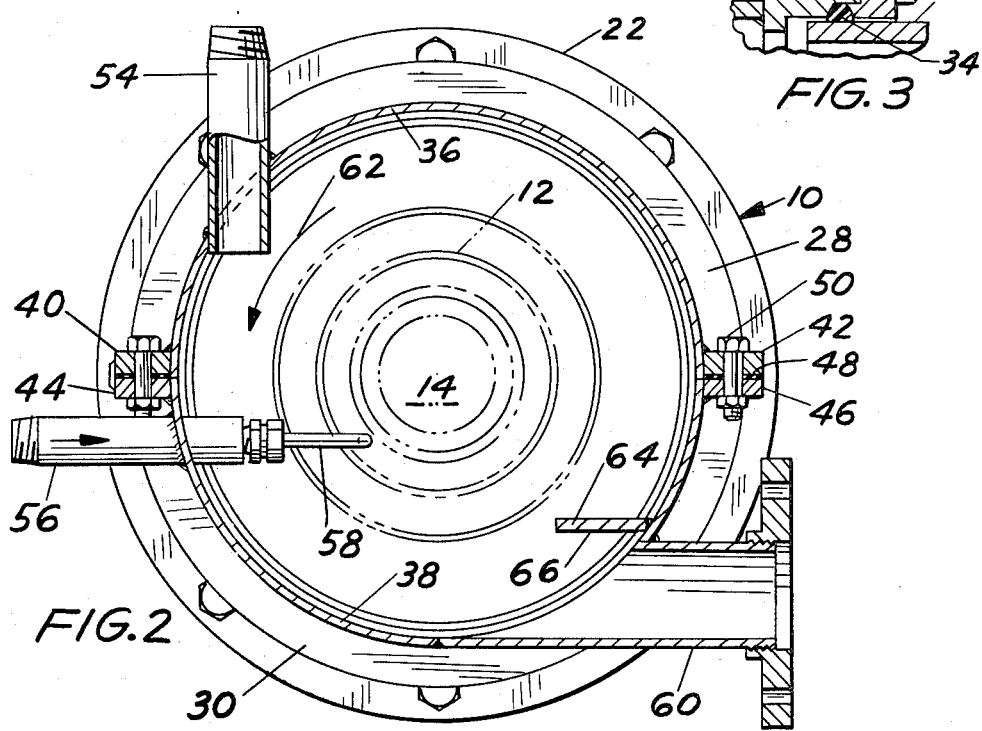

MECHANICAL COUPLING HOUSING ASSEMBLY

BACKGROUND OF THE INVENTION

This invention relates generally to improved housing assemblies for enclosing mechanical couplings between driving and driven shafts of high speed apparatus. More particularly, but not by way of limitation, this invention relates to an improved housing assembly that can accommodate misalignment and that can expand and contract axially as thermal expansion or contraction occurs in the driving and driven apparatus.

Guards or housings have been provided for couplings for many years. However, the previously constructed guards of the telescopic type, did not include effective seals that are required in the case of lubricated couplings installed on high speed apparatus.

SUMMARY OF THE INVENTION

It is one object of this invention to provide an improved housing assembly for enclosing a mechanical coupling that is of a telescoping type and, yet, one that is effectively sealed.

Another object of the invention is to provide an improved housing assembly for mechanical couplings that can be quickly and easily installed and requires little or no maintenance during its service life.

Still another object of the invention is to provide an improved housing assembly for mechanical couplings that includes an effective lubrication system.

This invention provides an improved housing assembly for enclosing a mechanical coupling connecting driving and driven shafts of high speed apparatus, such as a centrifugal compressor and motor. The housing assembly comprises annular first and second adapters arranged for connection with the apparatus in shaft encircling relationship and a generally cylindrical housing arranged to encircle the shafts between the adapters and having a first end including a radial flange. The first end and radial flange slidingly encircle the first adapter. An annular seal is disposed on the first adapter in encircling relationship adjacent the flange. Seal deforming means is provided for forcing the seal member into sliding and sealing engagement with the first adapter and into sealing engagement with the cylindrical housing.

The foregoing and additional objects and advantages of the invention will become more apparent as the following detailed description is read in conjunction with the accompanying drawing.

BRIEF DESCRIPTION OF THE DRAWING

FIG. 1 is a top view, partly in cross-section of a housing assembly constructed in accordance with the invention. The cross-section more clearly illustrates the internal components of the housing assembly.

FIG. 2 is a cross-sectional view of the housing assembly taken generally along the line 2—2 of FIG. 1.

FIG. 3 is an enlarged fragmentary, cross-sectional view of a portion of the housing assembly to more clearly illustrate the sealing structure utilized therein.

DETAILED DESCRIPTION OF THE PREFERRED EMBODIMENT

Referring to the drawing and to FIG. 1 in particular, shown therein and generally designated by the reference character 10 is a housing assembly constructed in accordance with the invention. The housing assembly 10 encircles a mechanical coupling 12 (shown in phantom lines) which connects driving and driven shafts 14 and 16, respectively, which are also shown in phantom lines. The driving shaft 14 extends from driving apparatus 18 which may be a motor or similar device and the driven shaft 16 extends from driven apparatus 20 which may be a compressor or blower.

The housing assembly 10 includes an adapter 22 that is connected to the driving apparatus 18. The adapter 22 encircles the shaft 14 and includes a cylindrical surface portion 24 that is arranged to slidingly receive an annular compression member 26. The compression member 26 is adjustably connected with semi-cylindrical radial flanges 28 and 30 (see FIG. 2) by a plurality of threaded fasteners 32. An annular seal member 34 encircles the adapter 22 and is located between the compression member 26 and the radial flanges 28 and 30.

As shown more clearly in FIG. 3, tightening the threaded fasteners 32 moves the compression member 26 toward the flanges 28 and 30 deforming the seal member 34 into sealing engagement with the cylindrical surface 24 on the adapter 22 and with the compression member 26 and radial flanges 28 and 30. The seal thus formed is equally applied around the cylindrical surface 24 and, yet, can be controlled by the amount of deformation applied to the seal member 34 so that a sliding relationship can be maintained between the adapter 22 and the radial flange 28.

The housing assembly 10 also includes an upper semi-cylindrical housing member 36 and a lower semi-cylindrical housing member 38. In addition to the radial flange 28, the upper housing member 36 includes axially extending flanges 40 and 42 that mate respectively with axially extending flanges 44 and 46 carried by the lower housing member 38. A gasket or seal 48 is disposed between the flanges 40 and 44 and between the flanges 42 and 46 to provide a seal between the upper and lower housing members 36 and 38. The axial flanges are releasably connected by plurality of threaded fasteners 50.

The opposite ends of the upper and lower housing members 36 and 38 are operably connected to an adapter 52 that is mounted on the driven member 20. If it is necessary to provide considerable telescoping movement between the housing assembly 10 and the driving and driven members 18 and 20, the end of the upper and lower housing members 36 and 38 adjacent the driven member 20 may also be provided with a flange, compression member and seal arrangement similar to that previously described. If it is not anticipated that a large amount of movement will occur, the housing members can be suitably connected with the adapter 52 excluding the telescoping arrangement.

As shown in FIG. 2, the upper housing member 36 may also include a vent 54 that extends therethrough providing communication between the interior of the housing assembly 10 and the exterior thereof. To reduce the volume of vapors escaping through the vent 54, it is preferred that the vent 54 be located as shown in FIG. 2, that is, so that the rotational direction of the coupling will not urge the vapor directly into the vent 54. If desired, the vent 54 can be provided with an appropriate filter.

Lubricant supply conduits 56 extend through the lower housing member 38 and are suitably connected thereto. The exposed ends of the conduits 56 are arranged for connection with a source of lubricant supply such as a pump and reservoir (not shown). The ends of the conduits 56 located in the interior of the housing assembly 10 are provided with suitable fittings 58 so that the lubricant flowing therethrough can be directed on to the desired portions of the coupling.

The lower housing member 38 is also provided with a lubricant return conduit 60 that is connected thereto. The conduit 60 permits fluid flow from the interior to the exterior of the housing member 38. It will be noted that the lubricant return conduit 60 is arranged on a tangent to the lower housing member 38. The particular relationship has been selected so that the rotation of the coupling which is in the direction shown by the arrow 62, aids in the discharge of lubricant from the housing assembly 10. The exterior end of the lubricant return conduit 60 is suitably arranged for connection to the lubricant reservoir (not shown).

Mounted within the interior of the lower housing member 38 is a deflection member 64. The deflection member 64 extends axially along the lower housing member 38 and has a lower surface 66 disposed in a plane that is substantially parallel to the tangential connection of the lubricant return conduit 60 with the housing member 38. The deflection member 64 and the direction of rotation of the coupling further aid in promoting lubricant flow through the housing assembly 10.

OPERATION OF THE PREFERRED EMBODIMENT

Before installing the coupling 12 on the driving and driven shafts 14 and 16, it is necessary to install the adapters 22 and 52 on the apparatus 18 and 20, respectively. The compression member 26 is placed on the adapter 22 with the seal 34 installed outwardly thereof. If it is desired to have a telescoping action at each end of the housing assembly 10, a similar procedure would be followed after installation of the adapter 52, that is, the compression member and the seal ring would be positioned thereon.

At this time, either the coupling 12 can be connected with the shafts 14 and 16, or the lower housing member 38 can be connected to the compression member 26. Assuming that the lower housing member 38 is installed prior to installing the shaft and the coupling 12, the threaded fasteners 32 are loosely assembled and the lubricant supply conduits 56 connected with the lubricant supply. The lubricant return conduit 60 is connected to the lubricant system with the return conduit 60 disposed in a generally horizontal position as illustrated in FIG. 2. The fittings 58 on lubricant supply conduits 56 may be moved out of the way or removed entirely until the coupling 12 is installed.

After the coupling 12 has been installed, and the fittings 58 positioned as desired, the upper housing member 36 is located with the flanges 40 and 42 mating with the flanges 44 and 46 on the lower housing member 38. Threaded fasteners 50 are then installed connecting the flanges as previously described. After this has been accomplished, the remaining threaded fasteners 32 are installed connecting the compression member 26 with radial flanges 28 and 30 on the upper and lower housing member 36 and 38, respectively. The threaded fasteners 32 are tightened until the seal 34 is deformed into sliding and sealing engagement with the annular surface 24 on the adapter 22. It will be obvious that the opposite end of the housing will be similarly installed if the double telescoping arrangement is utilized as is illustrated in FIGS. 1 and 2.

With the housing assembly 10 installed, it will be appreciated that rotation of the coupling 12, shaft 14 and shaft 16 in the direction of the arrow 62 causes lubricant entering the housing assembly 10 through the fittings 58 to move in the direction of the arrow 62 also. The lubricant impinges on the lower surface 66 of the deflection member 64 and is deflected downwardly into the return conduit 60. The centrifugal force acting on the lubricant as the coupling 12 rotates carries the lubricant into the return conduit 60 due to the tangential arrangement of the conduit 60 with respect to the lower housing member 38. Thus, the rotational direction of and forces generated by the coupling 12 are utilized to aid in obtaining a more efficient lubricant flow through the housing assembly 10.

Locating the lubricant supply and return conduits in the lower housing member 38 permits installation and adjustment of the supply fittings 58 to obtain optimum lubrication which will not be disturbed upon mounting of the upper housing member 36, thereon. It should also be pointed out that the split-housing arrangement illustrated permits removal of the upper housing member 36 without disassembly of the lubricant supply or return conduits and provides complete access to the coupling 12, shaft 14 and the shaft 16. Furthermore, the seals 48 and 34 provide a fluid-tight system and, yet, one in which telescoping of the housing assembly can occur if necessary to compensate for shaft misalignment and other thermal effects on the high speed apparatus connected by the coupling 12.

It will be understood that the foregoing is presented by way of example only and that many changes and modifications can be made thereto without departing from the spirit or scope of the invention.

The embodiments of the invention in which an exclusive property or privilege is claimed are defined as follows:

1. A housing assembly which encloses a mechanical coupling connecting driving and driven shafts of high speed apparatus, such as a centrifugal compressor and motor, said housing assembly comprising:
   annular first and second adapters connected with the apparatus in shaft encircling and non-rotating relationship;
   a generally cylindrical housing arranged to encircle the shafts and coupling between said adapters and having a first end including a radial flange, said first end slidingly encircling said first adapter; an annular seal member encircling said first adapter adjacent said flange; and
   seal deforming means adjustably connected to said radial flange for forcing said seal member into sliding and sealing engagement with said first adapter and into sealing engagement with said cylindrical housing.

2. The housing assembly for enclosing a mechanical coupling connecting driving and driven shafts of high speed apparatus, such as a centrifugal compressor and motor, said housing assembly comprising:
   annular first and second adapters arranged for connection with the apparatus in shaft encircling relationship;
   a generally cylindrical housing arranged to encircle the shafts between said adapters and including a first end having a radial flange, said first end slidingly encircling said first adapter, a semi-cylindrical upper housing member having edge portions, a semi-cylindrical lower housing member having edge portions for mating with the edge portions of said upper housing member, and means for releasably and sealingly connecting said upper and lower housing members along said edge portions;

an annular seal member encircling said first adapter adjacent said flange; and, seal deforming means for forcing said seal member into sliding and sealing engagement with said first adapter and into sealing engagement with said cylindrical housing.

3. The housing assembly of claim 2 wherein:

said radial flange has an annular groove adjacent said first adapter for receiving said seal member, said groove having a dimension parallel to the axes of the shafts that is less than the thickness of said seal member; and, said seal deforming means includes a compression member slidingly encircling said first adapter adjacent said radial flange and engaging said seal member, said seal deforming means biasing said compression member toward said flange to deform said seal member.

4. The housing assembly of claim 3 and also including coupling lubrication means mounted in said lower housing member adapted for connection with a source of lubricant for supplying lubricant to the coupling.

5. The housing assembly of claim 4 wherein said lubrication means also includes:

a lubricant return conduit connected to and communicating with the interior of said lower housing member, said return conduit extending tangentially from said lower housing member; and, a deflection member connected to said lower housing member and located therein relatively above said return conduit, said deflection member having a lower surface disposed in a plane generally parallel to the tangential connection of said return conduit and lower housing member whereby circulation of lubricant is enhanced.

6. A housing assembly for enclosing a mechanical coupling connecting driving and driven shafts of high speed apparatus, such as a centrifugal compressor and motor, said housing assembly comprising:

an annular first adapter arranged for connection with one of the apparatus generally concentrically with respect to the shafts;

an annular second adapter arranged for connection with the other apparatus generally concentrically with respect to the shafts;

an upper housing member of semi-cylindrical configuration extending between said adapters, said upper housing member having an end portion including a radial flange and having edge portions arranged to be disposed generally parallel to the shafts;

a lower housing member of semi-cylindrical configuration extending between said adapters and having an end portion including a radial flange and edge portions disposed in sealing relationship with the edge portions on said upper housing member when assembled to form a substantially cylindrical housing;

an annular seal member encircling said first adapter in engagement with said radial flanges and first adapters; and, deforming means including a compression member slidingly encircling said first annular adapter and mating with the radial flanges on the end portions of said housing members for deforming said seal member into sliding and sealing engagement with said first annular adapter, housing members and compression member.

7. The housing assembly of claim 6 and also including coupling lubrication means mounted in said lower housing member for supplying lubricant to the coupling, said lubrication means including:

a lubricant supply conduit extending through said lower housing member and having one end arranged for connection with a lubricant supply source and the other end disposed proximate the coupling;

a lubricant return conduit connected to and communicating with the interior of said lower housing member, said return conduit extending tangentially therefrom; and, a deflection member connected to said lower housing member and located therein above said return conduit, said deflection member having a lower surface disposed in a plane generally parallel to the tangential connection of said return conduit and lower housing member for enhancing the lubricant circulation.

8. The housing assembly of claim 6 and also including vent means mounted on and providing a flow path through said upper housing member, said vent means having an end within said housing assembly located so that shaft and coupling rotation directs the lubricant relatively away from said flow path.

9. A housing assembly for enclosing a mechanical coupling connecting driving and driven shafts of high speed apparatus, such as a centrifugal compressor and motor, said housing assembly comprising:

annular first and second adapters arranged for connection with the apparatus in shaft encircling relationship;

a generally cylindrical housing arranged to encircle the shafts between said adapters and having a first end including a radial flange, said first end slidingly encircling said first adapter;

an annular seal member encircling said first adapter adjacent said flange;

seal deforming means for forcing said seal member into sliding and sealing engagement with said first adapter and into sealing engagement with said cylindrical housing;

a second end on said housing including a second radial flange slidingly encircling said second adapter;

a second annular seal member encircling said second adapter adjacent said second radial flange; and, second seal deforming means for forcing said second annular seal member into sliding and sealing engagement with said second adapter and into sealing engagement with said cylindrical housing.

* * * * *